(12) United States Patent
Lee

(10) Patent No.: US 9,121,457 B2
(45) Date of Patent: Sep. 1, 2015

(54) WEAR COMPENSATOR OF CLUTCH ACTUATOR

(71) Applicant: Hyundai Motor Company, Seoul (KR)

(72) Inventor: Jin Woo Lee, Dongsong-eup (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/066,568

(22) Filed: Oct. 29, 2013

(65) Prior Publication Data

US 2015/0027842 A1 Jan. 29, 2015

(30) Foreign Application Priority Data

Jul. 23, 2013 (KR) .......................... 10-2013-0086441

(51) Int. Cl.
*F16D 13/75* (2006.01)
*F16D 25/12* (2006.01)

(52) U.S. Cl.
CPC .............. *F16D 13/75* (2013.01); *F16D 13/755* (2013.01); *F16D 25/126* (2013.01)

(58) Field of Classification Search
CPC ..................................................... F16D 13/755
USPC ........................... 192/111.11, 111.12, 111.13
See application file for complete search history.

(56) References Cited

U.S. PATENT DOCUMENTS 4,543,849 A * 10/1985 Yamamoto et al. ...... 74/501.5 R
4,572,341 A * 2/1986 Maucher ..................... 192/13 R

FOREIGN PATENT DOCUMENTS

| JP | 2005-527419 A | 9/2005 |
| KR | 2002-0088182 A | 11/2002 |
| KR | 2003-0086386 A | 11/2003 |
| KR | 10-2007-0037193 A | 4/2007 |
| KR | 10-2009-0010085 A | 1/2009 |
| KR | 10-2011-0127654 A | 11/2011 |
| KR | 10-2013-0003482 A | 1/2013 |
| KR | 10-2013-0047245 A | 5/2013 |
| WO | WO 03/082648 A1 | 10/2003 |
| WO | WO 2010/092278 A1 | 8/2010 |

* cited by examiner

*Primary Examiner* — Ramya Burgess
*Assistant Examiner* — Mark Manley
(74) *Attorney, Agent, or Firm* — Morgan, Lewis & Bockius LLP

(57) ABSTRACT

A wear compensator apparatus of a clutch actuator for compensating for worn-out thickness on a disc facing may include a main plate, a support plate installed on the main plate and linearly movable on the main plate, wherein the pull rod may be connected thereto, an moving piece installed on the support plate and linearly movable on the support plate, wherein the moving piece may be connected to the operation lever by a rotation shaft, a first space adjusting unit engaged with the pulling rod and moving the pull rod in a direction so that wear on the disc facing may be compensated for, and a second space adjusting unit engaged with the moving piece and moving the moving piece in the other direction so that an initial position of the rotation shaft may be maintained when the pull rod may be moved in the direction.

5 Claims, 4 Drawing Sheets

WEAR COMPENSATOR OF CLUTCH ACTUATOR

CROSS REFERENCE TO RELATED APPLICATION

The present application claims priority to Korean Patent Application No. 10-2013-0086441 filed Jul. 23, 2013, the entire contents of which is incorporated herein for all purposes by this reference.

BACKGROUND OF THE INVENTION

1. Field of the Invention

The present invention relates to a wear compensator of a clutch actuator capable of compensating for wear on a disc facing 2. Description of Related Art Typically, a clutch of a manual transmission for a vehicle transmits power by pressing a clutch disc against a flywheel with a pressure plate, and disconnects power by stopping pressing the clutch disc so as to enter a shift mode.

Accordingly, when a driver depresses a clutch pedal, the pedal effort is transmitted to an operation fork to operate a clutch release bearing, such that the clutch is released. In an automated manual transmission or a dual-clutch transmission, an electromagnetic actuator that uses a motor and the like as a driving source operates an operating fork automatically so as to operate a clutch, and, therefore, speed can be accurately and conveniently changed without manual shifting by a driver as in a manual transmission.

According to the disclosure in a conventional art, when an electric signal is applied to a clutch actuator, the clutch actuator receives the signal so as to rotate a motor, a roller cam is operated which has a spirally cut portion at its center and is connected to a lead screw of the motor shaft. With the operation of the roller cam, a lever is pushed up so that it pushes a release bearing adjacent the distal portion of the lever 34, and thereby engage force transmitted to a diaphragm spring and a pressure plate of a clutch is increased, so that the clutch disc is strongly pushed and the driving force is transmitted between an engine and a transmission.

According to the related art, however, if a disc facing of a pressure plate is worn as a clutch undergoes repeated shift operations, free travel (F) of the clutch disc is increased, and thus precise control by a TCU is difficult to be conducted, and shock or slip occurs in the shift operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wear compensator of a clutch actuator capable of maintaining a free travel of a clutch disc by compensating for a worn-out thickness of a disc facing.

In an aspect of the present invention, a wear compensator apparatus of a clutch actuator for compensating for worn-out thickness on a disc facing to transmit a driving force of an operation lever of the clutch actuator to a pull rod, the wear compensator may include a main plate, a support plate installed on the main plate and linearly movable on the main plate, wherein the pull rod is connected thereto, an moving piece installed on the support plate and linearly movable on the support plate, wherein the moving piece is connected to the operation lever by a rotation shaft, a first space adjusting unit engaged with the pulling rod and moving the pull rod in a direction so that wear on the disc facing is compensated for, and a second space adjusting unit engaged with the moving piece and moving the moving piece in the other direction so that an initial position of the rotation shaft is maintained when the pull rod is moved in the direction.

The first space adjusting unit may include a first screw fixed on an outer diameter surface of the pull rod, a first nut member engaged with the first screw, a first return spring configured to rotate the first nut member using an elastic force thereof, and a stopper fixed to the support plate and selectively confining the first nut member.

The second space adjusting unit may include a second screw extending from one end of the moving piece, a second nut member provided on the support plate and engaged with the second screw, and a second return spring configured to rotate the second nut member when the pull rod is moved in the direction by the first space adjusting unit.

The main plate may have a guide shaft provided thereon, and the stopper may have a guide rivet releasing a confinement on the first nut member when the stopper comes into contact with the guide shaft as the support plate is moved in the direction.

The main plate may have a guide piece provided therein in which a sloped surface is formed so that the movement of the first return spring is guided.

The first nut member may have a ratchet portion confined by the stopper on an end thereof.

The ratchet portion may include a first ratchet portion having teeth formed in a direction on an outer peripheral surface thereof, and a second ratchet portion being contiguous to the first ratchet portion and having teeth formed in another direction on an outer peripheral surface thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
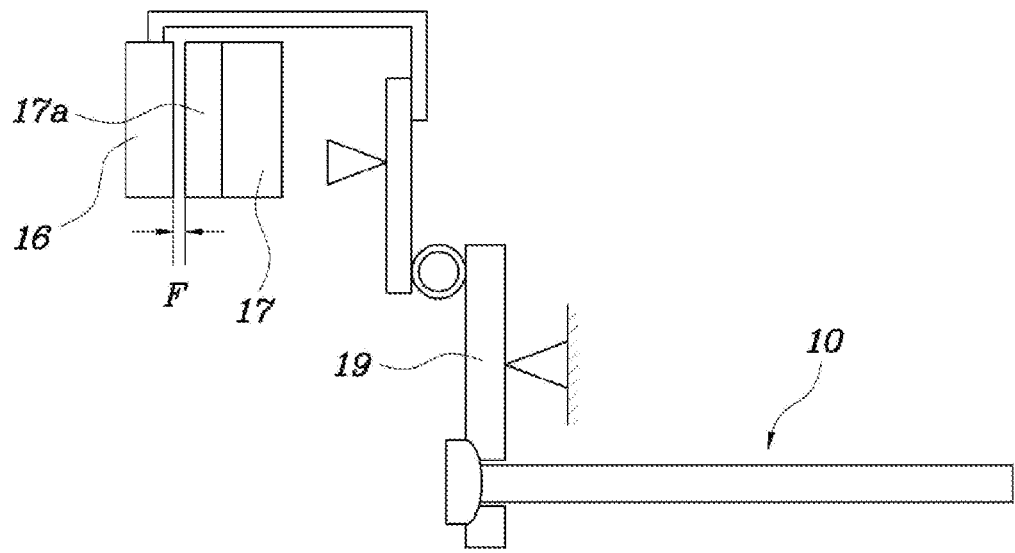
FIG. 1 is a diagram conceptually illustrating a wear compensator of a clutch actuator according to an exemplary embodiment of the present invention before wear compensation.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a wear compensator of a clutch actuator according to an exemplary embodiment of the present invention will be described in detail with reference to the accompanying drawings.

The wear compensator of a clutch actuator according to an exemplary embodiment of the present invention may compensate for worn-out thickness on a disc facing so that the driving force of the operation lever in a clutch actuator may be provided to the pull rod of a fork.

Figure 2:
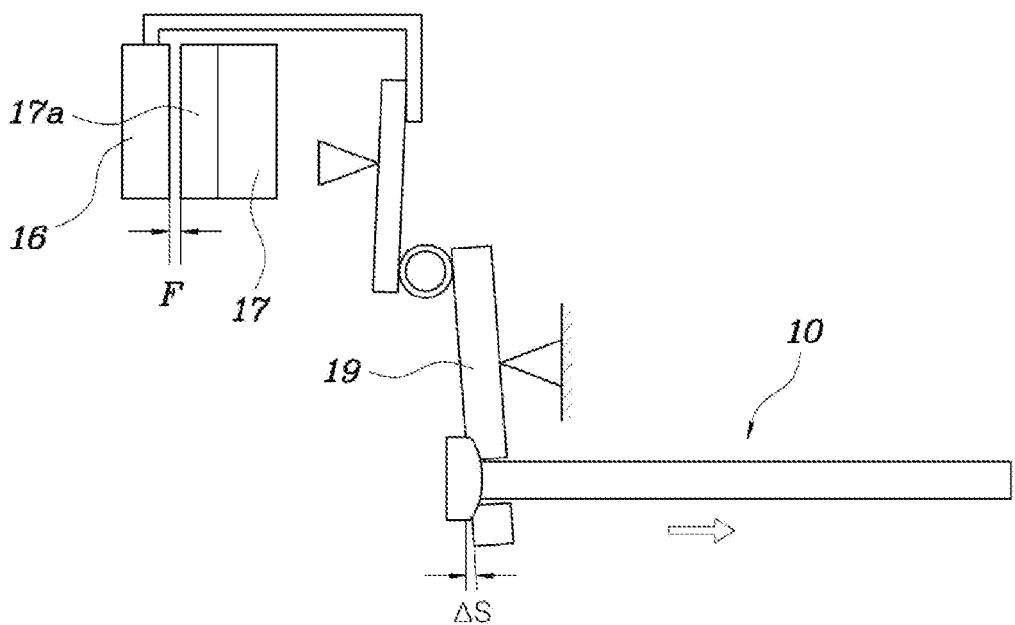
FIG. 2 is a diagram conceptually illustrating the wear compensator of a clutch actuator according to the exemplary embodiment of the present invention after wear compensation.

FIG. 1 is a diagram conceptually illustrating a wear compensator of a clutch actuator according to an exemplary embodiment of the present invention before wear compensation, and FIG. 2 is a diagram conceptually illustrating a wear compensator of a clutch actuator according to an exemplary embodiment of the present invention after wear compensation.

As shown in FIG. 1, a driving force is transmitted from the operation lever of the clutch actuator to the pull rod, the driving force of the pull rod is transmitted via a fork 19 to a pressure plate 17 having a disc facing 17a formed thereon, so that the pressure plate 17 may is pushed against a clutch disc 16. As the clutch disc 16 undergoes repeated shift operations, the disc facing 17a on the pressure plate 17 is worn out, so that free travel F of the clutch disc 16 may be increased by the amount of how worn the thickness is.

As shown in FIG. 2, in order to overcome the problem, in the present embodiment, wear compensation amount ΔS is provided by a wear compensator 10, so as to compensate for the thickness thinned by wear on the disc facing 17a.

Figure 3:
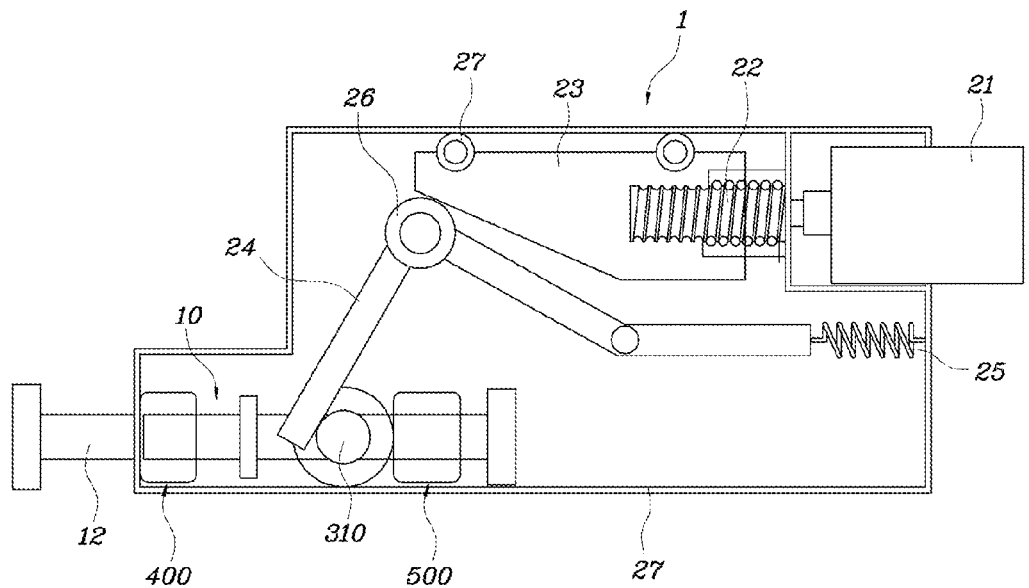
FIG. 3 is a diagram illustrating the configuration of a wear compensator of a clutch actuator according to an exemplary embodiment of the present invention.
Figure 4:
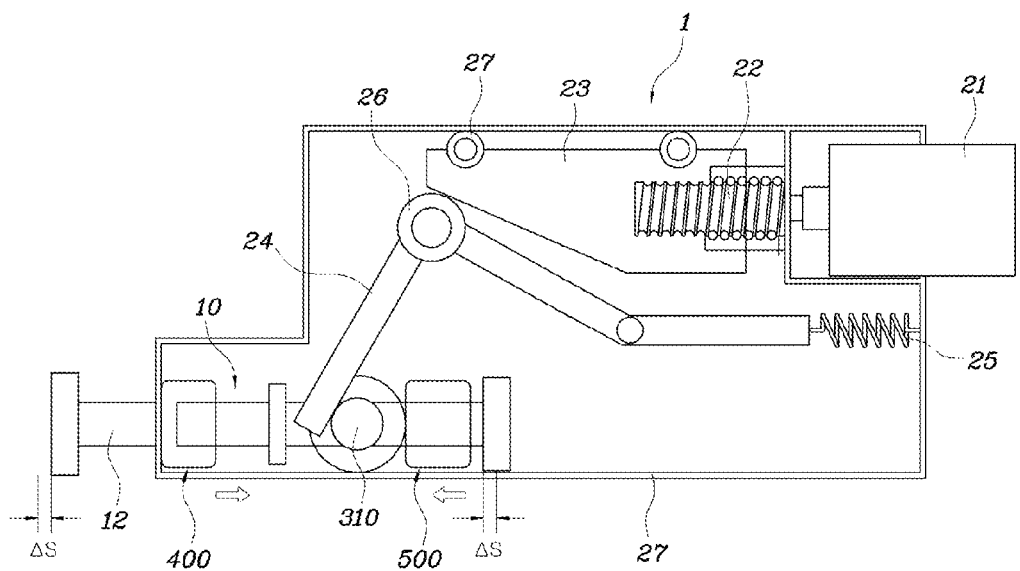
FIG. 4 is a diagram illustrating the wear compensator of a clutch actuator according to the exemplary embodiment of the present invention after compensation.
Figure 5:
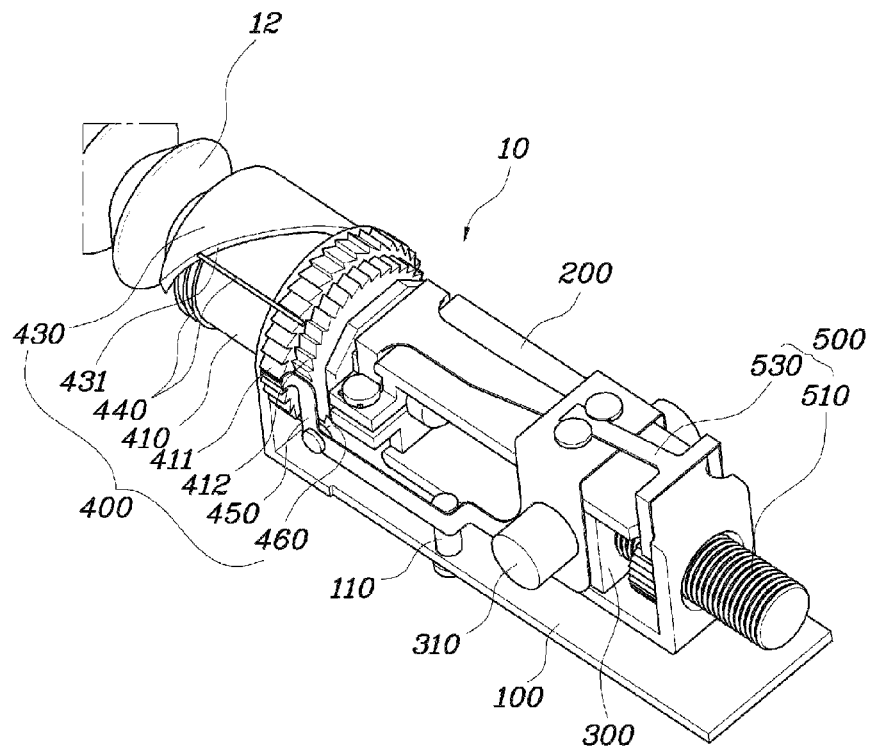
FIG. 5 is a perspective view of a wear compensator of a clutch actuator according to an exemplary embodiment of the present invention.

FIG. 3 is a diagram illustrating the configuration of a wear compensator of a clutch actuator according to an exemplary embodiment of the present invention, FIG. 4 is a diagram illustrating the wear compensator of a clutch actuator according to the exemplary embodiment of the present invention after compensation, and FIG. 5 is a perspective view of a wear compensator of a clutch actuator according to an exemplary embodiment of the present invention.

As shown in FIGS. 3 to 5, the wear compensator 10 includes a main plate 100, a support plate 200, a moving piece 300, a first space adjusting unit 400 and a second space adjusting unit 500.

The main plate 100 supports the support plate 200 and the first space adjusting unit 400, and is fixed to the housing 27 of a clutch actuator.

The main plate 100 has a guide shaft 110 installed thereon by which a stopper 450 to be described is supported. The guide shaft 110 may release the confinement on a first nut member 410 by the stopper 450 in such manner that it widens the stopper 450 by the contact with a guide rivet 460 when the support plate 200 is moved in a direction.

On the main plate 100, installed is a support bearing 320 for smoothly moving the support plate 200 in a linear direction, a first nut member 410 configuring a first space adjusting unit 400, and a guide piece 430 having a sloped surface 431 to guide the movement of a first return spring 440. In this embodiment, the guide piece 430 is fixed to the main plate 100 in order to support the first return spring 440, but the guide piece 430 may be fixed to the housing 27 of the clutch actuator instead of the main plate 100.

The support plate 200 is installed on the main plate 100 such that it can linearly move, and thereby it moves with the pull rod 12 linearly. To one end of the support plate 200, the pull rod 12 assembled with the first space adjusting unit 400 is connected. At the other side of the port plate 200, a second space adjusting unit 500 is provided.

On the support plate 200, the stopper 450 selectively confining the first nut member 410, the moving piece 300 which is linearly movable, a second nut member 520 engaging with the moving piece 300, and a second return spring 530 for selectively rotating the second nut member 520 are installed, respectively.

The moving piece 300 is connected to the operation lever 11 of the clutch actuator by the rotation shaft 310. Further, a second screw 510 engaging with the second nut member 520 is extended from one end of the moving piece 300.

The moving piece 300 may move linearly on the main plate 100 as well as the support plate 200. For example, when the moving piece 300 is pulled in a direction of the support plate 200 by the operation lever 11, the support plate 200 is also moved in a direction of the main plate 100 by the movement of the moving piece 300 in the direction.

Further, since the moving piece 300 is movable linearly at the inner side of the support plate 200, if the pull rod 12 moves in a direction by the amount of wear compensation (ΔS) by the first space adjusting unit 400, the moving piece 300 may move in the other direction by the amount of wear compensation (ΔS) by the rotation of the second nut member 520. That is, if the pull rod 12 is moved in a direction so that the amount of wear compensation (ΔS) is required, in order to maintain the rotation shaft 310 at the initial position, the moving piece 300 is relatively moved in the other direction of the support plate 200 opposite to the direction in which the pull rod 12 is moved.

The first space adjusting unit 400 moves the pull rod 12 in a direction by the amount of wear compensation (ΔS) so that wear on the disc facing is compensated for.

The first space adjusting unit 400 includes a first screw 420 fixed on the outer diameter surface of the pull rod 12, the first nut member 410 fixed to the main plate 100 and engaged with the first screw 420, the first return spring 440 providing the elastic force for rotating the first nut member 410, and the stopper 450 selectively confining the first nut member 410.

Here, the first screw 420 has the inner diameter surface closely contacting the outer diameter surface of the pull rod 12. On the outer diameter surface of the first screw 420, a thread is formed that engages with the first nut member 410. In order to confine the stopper 450, the first nut member 410 has a first ratchet portion 411 having teeth formed in one direction on its outer peripheral surface, and a second ratchet portion 412 being contiguous to the first ratchet portion 411 and having teeth formed in another direction on its outer peripheral surface.

In addition, the first return spring 440 is a torsion spring to provide the elastic force for rotating the first nut member 410. The elastic force is limited by the stopper 450. In a normal state, one end of the stopper 450 is fixed to the support plate 200, and the other end of the stopper 450 confines the first ratchet portion 411 of the first nut member 410 and the second ratchet portion 412 of the first nut member 410 together.

Further, the first return spring 440 is provided with the guide rivet 460. The guide rivet 460 may release the confinement on the first nut member 410 by the stopper 450 by the contact with the guide shaft 110 when the support plate 200 is moved in a direction.

By doing so, when the moving piece 300 and the support plate 200 are moved in the direction by the operation lever 11, the guide rivet 460 of the stopper 450 moves over the guide shaft 110 to release the confinement on the first nut member 410 by the stopper 450. Here, the first nut member 410 is rotated by the elastic force of the first return spring 440, and the first screw 420 and the pull rod 12 may be moved in the direction by the rotation of the first nut member 410. As a result, since a spaced distance corresponding to the amount of wear compensation (ΔS) is created between the first nut member 410 and the first screw 420, it can result in the same effect as if the pull rod 12 moved in the direction by the amount of wear compensation (ΔS).

When the second space adjusting unit 500 moves in the direction of the pull rod 12, it moves the moving piece 300 in the other direction so as to maintain the initial position of the rotation shaft 310.

The second space adjusting unit 500 includes the second screw 510 extending from one end of the moving piece 300, the second nut member 520 engaged with the second screw 510, the second return spring 530 for rotating the second nut member 520 when the pull rod 12 is moved in the direction by the first space adjusting unit 400.

When the moving piece 300 is pulled in the other direction of the support plate 200 by the operation lever 11 of the actuator, the second return spring 530 rotates the second nut member 520, such that the moving piece 300 including the second screw 510 is linearly moved in the other direction by the amount of wear compensation (ΔS) with the rotation of the second nut member 520. As a result, the pull rod 12 is moved in the direction by the amount of wear compensation (ΔS) while the initial position of the rotation shaft 310 is maintained, such that the worn-out thickness on the disc facing can be compensated for.

Now, an operation process of the present invention having the above-described configuration will be described.

Figure 6:
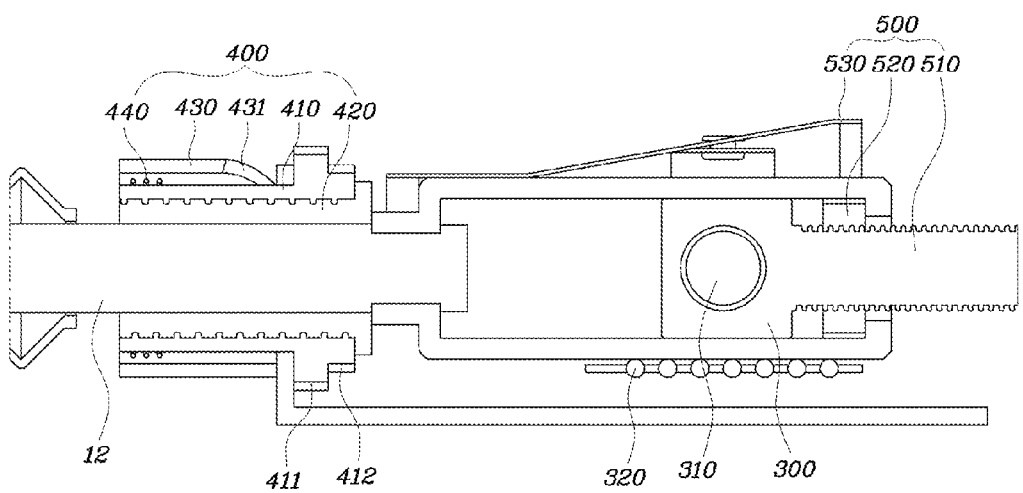
FIG. 6 is a diagram illustrating the configuration of a wear compensator of a clutch actuator according to an exemplary embodiment of the present invention before wear compensation.
Figure 7:
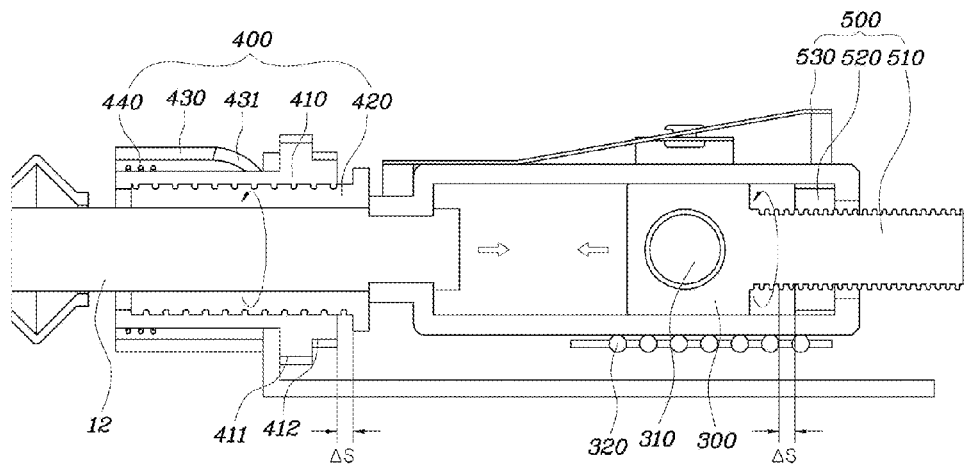
FIG. 7 is a diagram illustrating the wear compensator of a clutch actuator according to the exemplary embodiment of the present invention after wear compensation.
Figure 8:
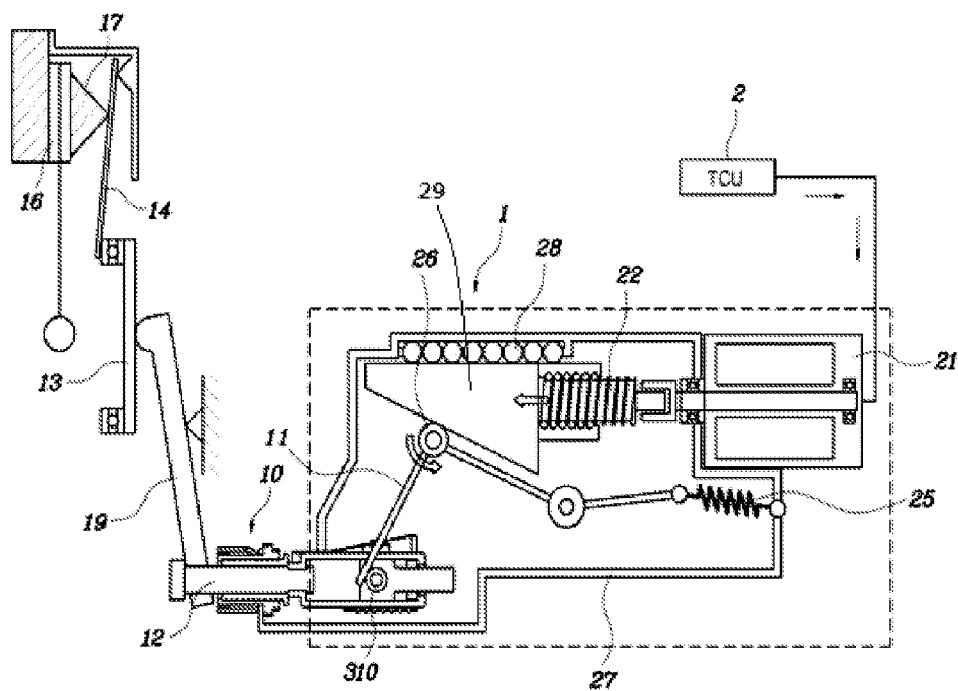
FIG. 8 is a diagram illustrating the operation of the clutch actuator after wear compensation by the wear compensator according to an exemplary embodiment of the present invention.

FIG. 6 is a diagram illustrating the configuration of a wear compensator of a clutch actuator according to an exemplary embodiment of the present invention before wear compensation, FIG. 7 is a diagram illustrating the wear compensator of a clutch actuator according to the exemplary embodiment of the present invention after wear compensation, and FIG. 8 is a diagram illustrating the operation of the clutch actuator after wear compensation by the wear compensator according to an exemplary embodiment of the present invention.

As shown in FIGS. 6 and 7, when the moving piece 300 is pulled in a direction of the support plate 200 by the operation lever 11 of the actuator, the support plate 200 is moved in a direction of the main plate 100 along with the moving piece 300.

When the support plate 200 is moved in the direction of the main plate 100, the guide rivet 460 of the stopper 450 moves over the guide shaft 110 to release the confinement of the first nut member 410 by the stopper 450, so that the first nut member 410 is rotated by the elastic force by the first return spring 440. At this time, the first screw 420 and the pull rod 12 are moved in the direction by the amount of wear compensation (ΔS) with the rotation of the first nut member 410.

Thereafter, when the moving piece 300 is pulled in the other direction of the support plate 200 by the operation lever 11 of the actuator, the second return spring 530 rotates the second nut member 520, such that the moving piece 300 including the second screw 510 is linearly moved in the other direction by the amount of wear compensation (ΔS) with the rotation of the second nut member 520.

Accordingly, the pull rod 12 is moved in the direction by the amount of wear compensation (ΔS) with the initial position of the rotation shaft 310 connected to the operation lever 11 maintained at the same position, such that the worn-out thickness on the disc facing can be compensated for by the amount of wear compensation (ΔS).

As described above, once the wear compensation for the disc facing is completed, as shown in FIG. 8, the driving force of the clutch actuator may be normally transmitted to the clutch disc through the wear compensator which has completed wear compensation.

That is, when the TCU 2 applies an operation signal to the electric motor 21, the electric motor 21 moves the trolley 29 supported by the needle roller bearing 28 through the operation rod 22. At this time, the operation lever 11 is rotated by a predetermined degree by the roller bearing 26 and the assist spring 25, and the rotation force of the operation lever 11 is transmitted to the wear compensator by the rotation shaft 310.

Here, when the wear compensator receives the driving force of the clutch actuator to transmit it to the pull rod 12, the driving force transmitted to the pull rod 12 is transmitted to the pressure plate 17 via the fork 19, the clutch releasing bearing 13 and the diagram spring 14, such that the pressure plate 17 may be pushed against the clutch disc 16 efficiently.

As described above, when a disc facing is worn, the worn-out thickness of the disc facing may be compensated for by adjusting the location of the pull rod, and thus free travel of a clutch disc can be maintained. Consequently, the automatically controlled clutch actuator can be precisely controlled, and durability of a product can be improved so that the lifetime is elongated, and so on.

As set forth above, according the wear compensator of a clutch actuator thus configured, when wear occurs on a disc facing, a free travel of a clutch disc can be maintained by adjusting the position of a pull rod so as to compensate for worn-out thickness on the disc facing.

Further, by compensating for wear on the disc facing, an automatically controlled clutch actuator such as a double clutch transmission (DCT) and automated manual transmission (AMT) can be precisely controlled, and duration of a product can be improved so that the life span of the product can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wear compensator apparatus of a clutch actuator for compensating for worn-out thickness on a disc facing to transmit a driving force of an operation lever of the clutch actuator to a pull rod, the wear compensator comprising: a main plate;
a support plate installed on the main plate and linearly movable on the main plate, wherein the pull rod is connected thereto;
a moving piece installed on the support plate and linearly movable on the support plate, wherein the moving piece is connected to the operation lever by a rotation shaft;
a first space adjusting unit engaged with the pull rod and moving the pull rod in a first direction so that wear on the disc facing is compensated for; and
a second space adjusting unit engaged with the moving piece and moving the moving piece in a second direction so that an initial position of the rotation shaft is maintained when the pull rod is moved in the first direction
wherein the first space adjusting unit includes:
a first screw fixed on an outer diameter surface of the pull rod; a first nut member engaged with the first screw;
a first return spring configured to rotate the first nut member using an elastic force thereof; and
a stopper fixed to the support plate and selectively confining the first nut member,
wherein the first nut member has a ratchet portion confined by the stopper on an end thereof, and
wherein the ratchet portion includes:
a first ratchet portion having teeth formed in a first ratchet direction on an outer peripheral surface thereof; and
a second ratchet portion being contiguous to the first ratchet portion and having teeth formed in a second ratchet direction on an outer peripheral surface thereof.

2. The wear compensator apparatus according to claim 1, wherein the second space adjusting unit includes:
a second screw extending from one end of the moving piece;
a second nut member provided on the support plate and engaged with the second screw;
and
a second return spring configured to rotate the second nut member when the pull rod is moved in the first direction by the first space adjusting unit.

3. The wear compensator apparatus according to claim 1, wherein the main plate has a guide shaft provided thereon, and the stopper has a guide rivet releasing a confinement on the first nut member when the stopper comes into contact with the guide shaft as the support plate is moved.

4. The wear compensator apparatus according to claim 1, wherein the main plate has a guide piece provided therein in which a sloped surface is formed so that movement of the first return spring is guided.

5. A wear compensator apparatus of a clutch actuator for compensating for worn-out thickness on a disc facing to transmit a driving force of an operation lever of the clutch actuator to a pull rod, the wear compensator comprising: a main plate;
a support plate installed on the main plate and linearly movable on the main plate,
wherein the pull rod is connected thereto;
a moving piece installed on the support plate and linearly movable on the support plate, wherein the moving piece is connected to the operation lever by a rotation shaft;
a first space adjusting unit engaged with the pull rod and moving the pull rod in a first direction so that wear on the disc facing is compensated for; and
a second space adjusting unit engaged with the moving piece and moving the moving piece in another direction so that an initial position of the rotation shaft is maintained when the pull rod is moved in the first direction,
wherein the first space adjusting unit includes:
a first screw fixed on an outer diameter surface of the pull rod; a first nut member engaged with the first screw;
a first return spring configured to rotate the first nut member using an elastic force thereof; and
a stopper fixed to the support plate and selectively confining the first nut member, and
wherein the main plate has a guide shaft provided thereon, and the stopper has a guide rivet releasing a confinement on the first nut member when the stopper comes into contact with the guide shaft as the support plate is moved.

* * * * *